United States Patent
Wu

(10) Patent No.: US 12,193,049 B2
(45) Date of Patent: Jan. 7, 2025

(54) METHOD FOR SELECTING RANDOM ACCESS RESOURCE AND TERMINAL

(71) Applicant: VIVO MOBILE COMMUNICATION CO.,LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 507 days.

(21) Appl. No.: 17/381,264

(22) Filed: Jul. 21, 2021

(65) Prior Publication Data

US 2021/0352713 A1 Nov. 11, 2021

Related U.S. Application Data

(63) Continuation of application No. PCT/CN2020/073519, filed on Jan. 21, 2020.

(30) Foreign Application Priority Data

Jan. 25, 2019 (CN) .......................... 201910075299.X

(51) Int. Cl.
  *H04W 74/00* (2009.01)
  *H04L 5/00* (2006.01)
  *H04W 74/0833* (2024.01)

(52) U.S. Cl.
  CPC ......... *H04W 74/002* (2013.01); *H04L 5/0048* (2013.01); *H04W 74/0833* (2013.01)

(58) Field of Classification Search
  CPC ........... H04W 74/008; H04W 74/0833; H04W 74/002; H04W 72/21; H04W 72/02; H04W 72/1268; H04W 24/08; H04W 72/0446; H04W 72/23; H04W 72/53; H04W 74/0836; H04W 74/006; H04L 5/0048; H04L 5/001; H04L 5/0044; H04L 5/0053
  See application file for complete search history.

(56) References Cited

U.S. PATENT DOCUMENTS

| 2016/0157267 | A1 | 6/2016 | Frenne et al. |
| 2018/0025516 | A1 | 1/2018 | Wei et al. |
| 2018/0110074 | A1* | 4/2018 | Akkarakaran ........ H04W 72/21 |
| 2018/0139785 | A1* | 5/2018 | Zhang ............... H04W 74/0833 |

(Continued)

FOREIGN PATENT DOCUMENTS

| CN | 106797656 A | 5/2017 |
| CN | 106900074 A | 6/2017 |

(Continued)

OTHER PUBLICATIONS

Huawei, "Timers and counters for two-steps RACH", 3GPP TSG-RAN WG2 Meeting #104, R2-1816604, Spokane, US, Nov. 12-16, 2018.

(Continued)

*Primary Examiner* — Ricardo H Castaneyra
(74) *Attorney, Agent, or Firm* — Price Heneveld LLP

(57) ABSTRACT

Embodiments of this disclosure provide a method for selecting a random access resource and a terminal. The method includes: determining first information; and determining a random access resource based on a correspondence between first information and random access resources; where the first information includes any one of the following: a signal, an uplink carrier, or a random access procedure type.

19 Claims, 3 Drawing Sheets

(56) References Cited

U.S. PATENT DOCUMENTS

| | | | |
|---|---|---|---|
| 2018/0205516 A1 | 7/2018 | Jung et al. | |
| 2018/0368005 A1 | 12/2018 | Fukui et al. | |
| 2019/0215749 A1* | 7/2019 | Shih | H04W 74/085 |
| 2019/0357265 A1 | 11/2019 | Ren et al. | |
| 2019/0387548 A1* | 12/2019 | Kim | H04W 72/20 |
| 2020/0029369 A1 | 1/2020 | Huang et al. | |
| 2020/0100297 A1* | 3/2020 | Agiwal | H04L 5/0048 |
| 2020/0146069 A1* | 5/2020 | Chen | H04W 52/362 |

FOREIGN PATENT DOCUMENTS

| | | |
|---|---|---|
| CN | 108282895 A | 7/2018 |
| CN | 108781374 A | 11/2018 |
| JP | 2017516348 A | 6/2017 |
| WO | 2018064367 A1 | 4/2018 |
| WO | 2018110857 A1 | 6/2018 |
| WO | 2018176503 A1 | 10/2018 |

OTHER PUBLICATIONS

Huawei, "Corrections for RA procedure with multi-beam operation", 3GPP TSG-RAN WG2 Meeting #AH1801, R2-1800994, Vancouver, Canada, Jan. 22-26, 2018.
Interdigital, Inc., "Aspects related to Supplementary Uplink", 3GPP TSG RAN WGI Meeting AH1801, RI-1800605, Vancouver, Canada, Jan. 22-26, 2018.

\* cited by examiner

METHOD FOR SELECTING RANDOM ACCESS RESOURCE AND TERMINAL

CROSS-REFERENCE TO RELATED APPLICATIONS

This application is a continuation application of International Application No. PCT/CN2020/073519 filed on Jan. 21, 2020, which claims priority to Chinese Patent Application No. 201910075299. X, filed in China on Jan. 25, 2019, both disclosures of which are incorporated herein by reference in their entireties.

TECHNICAL FIELD

Embodiments of this disclosure relate to the field of communications technologies, and specifically, to a method for selecting a random access resource and a terminal.

BACKGROUND

In the $5^{th}$ generation (5G) mobile communications system, to reduce access delay, a 2-step random access channel (2-step RACH) is introduced. While random access resources include both random access resources used in 2-step random access procedures and 4-step random access procedures, how a terminal selects a random access resource requires a solution.

SUMMARY

According to a first aspect of the embodiments of this disclosure, a method for selecting a random access resource is provided and includes:
  determining first information; and
  determining a random access resource based on a correspondence between first information and random access resources; where
  the first information includes any one of the following: a signal, an uplink carrier, or a random access procedure type.

According to a second aspect of the embodiments of this disclosure, a terminal is further provided and includes:
  a first determining module, configured to determine first information; and
  a second determining module, configured to determine a random access resource based on a correspondence between first information and random access resources; where
  the first information includes any one of the following: a signal, an uplink carrier, or a random access procedure type.

According to a third aspect of the embodiments of this disclosure, a terminal is further provided and includes a processor, a memory, and a program stored in the memory and capable of running on the processor, where when the program is executed by the processor, the steps of the foregoing method for selecting a random access resource are implemented.

According to a fourth aspect of the embodiments of this disclosure, a computer-readable storage medium is further provided, where the computer-readable storage medium stores a computer program, and when the computer program is executed by a processor, the steps of the foregoing method for selecting a random access resource are implemented.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference signs represent the same components. In the accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains based on the embodiments of this disclosure shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, terms such as "an example" or "for example" are used to represent giving an example, an instance, or an illustration. Any embodiment or design solution described as "exemplary" or "for example" in the embodiments of this disclosure should not be construed as being more preferred or advantageous than other embodiments or design solutions. Specifically, the terms such as "an example" or "for example" are used to present related concepts in a specific manner.

Figure 1:
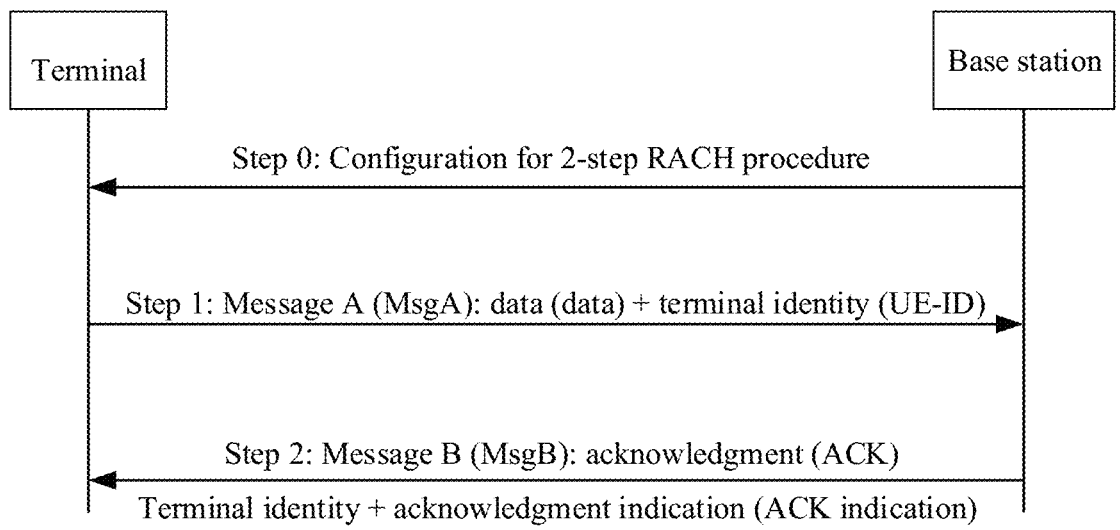
FIG. 1 is a schematic diagram of a 2-step random access procedure.

For better understanding the technical solutions in the embodiments of this disclosure, the following describes several technical points:
I. Introduction to 2-Step RACH Procedure:
Referring to FIG. 1, steps of the 2-step RACH procedure are as follows:
Step 0: A network side configures configuration information of a 2-step RACH for a terminal.
For example, the configuration information may include: transmission resource information corresponding to a request message (MsgA) and transmission resource information corresponding to an acknowledgment message (MsgB).

Step 1: The terminal triggers a 2-step RACH procedure.

The terminal transmits MsgA to the network side, for example, through a physical uplink shared channel (PUSCH). In addition, the terminal may also transmit information carried by a physical random access channel (PRACH) to the network side.

Step 2: The network side transmits MsgB to the terminal.

If the terminal fails to receive MsgB, the terminal retransmits MsgA.

II. Introduction to Random Access Procedure

A random access procedure of the terminal may include:
(1) a contention-based random access procedure (4-step random access channel (4-step RACH)); and
(2) a contention-free random access procedure.

In the "contention-based random access procedure", a terminal transmits a random access request (message 1 (Msg 1)) to a network side. After receiving Msg1, the network side transmits a random access response (RAR) (message 2 (Msg2), which carries uplink grant information) to the terminal. According to the uplink grant in Msg2, the terminal executes the media access control (MAC) layer packet assembly function to generate a MAC protocol data unit (PDU), and stores the MAC PDU in a message 3 (Msg3) buffer. Then the terminal transmits the MAC PDU in the Msg3 buffer through a hybrid automatic repeat request (HARQ) process. After receiving Msg3, the network side transmits message 4 (Msg4) (for example, a contention resolution identity) to the terminal. The terminal receives Msg4, and determines whether contention is successfully resolved. If the contention is successfully resolved, the random access procedure is successful; otherwise, the terminal re-initiates a random access procedure.

In the re-initiated random access procedure, when the terminal receives the uplink grant in Msg2 again, the terminal directly fetches the previously stored MAC PDU from the Msg3 buffer and transmits the MAC PDU through the HARQ process. After the random access procedure is completed, the terminal clears a HARQ buffer used for Msg3 transmission in the random access procedure.

In the "contention-free random access procedure", the terminal transmits Msg1 to the network side. After receiving Msg1, the network side transmits Msg2 to the terminal, where Msg2 carries uplink grant information and identification information of the terminal (for example, a random access preamble index of Msg1). If the random access preamble index is the same as a random access preamble number in Msg1 transmitted by the terminal, the terminal considers that the random access procedure is successful; otherwise, the terminal re-initiates a random access procedure.

Each time the terminal initiates (or re-initiates) a random access procedure, the terminal may select a random access resource based on downlink signal quality (for example, reference symbol received power (RSRP) of a synchronization signal block (SSB)) corresponding to a random access resource, to increase a random access success rate. Therefore, each time the terminal initiates (or re-initiates) the random access procedure, the terminal may select the "contention-based random access procedure" or the "contention-free random access procedure".

An available time-frequency resource for a PRACH may be referred to as a physical random access channel occasion (PRACH Occasion, PO).

III. Introduction to Supplementary Uplink Carrier (SUL Carrier):

In a 5G system, two uplink carriers may be configured for one downlink carrier, of which one is a supplementary uplink carrier that may be configured for a primary cell (PCell) or a secondary cell (SCell). When the terminal initiates a random access procedure, resources of the random access procedure may be configured on both uplink carriers for one cell. In this case, the network side may configure an RSRP threshold. In a case that RSRP of a downlink signal measured by the terminal exceeds the threshold, the terminal transmits a random access signal by using one uplink carrier designated by a network; otherwise, the terminal transmits the random access signal by using another uplink carrier.

The technology described herein is not limited to 5G systems and subsequent evolved communications systems.

The technologies described herein are not limited to LTE/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are both part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the foregoing systems and radio technologies, and may also be used for other systems and radio technologies.

Figure 2:
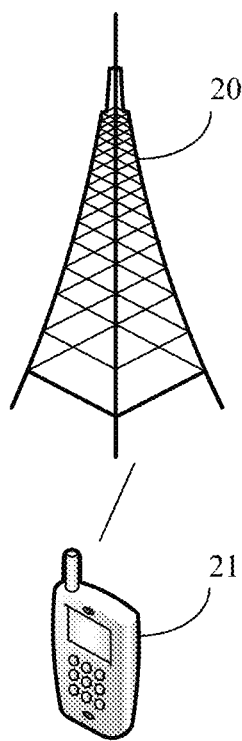
FIG. 2 is a schematic architectural diagram of a wireless communications system according to an embodiment of this disclosure.

The following describes the embodiments of this disclosure with reference to the accompanying drawings. A method for selecting a random access resource and a terminal provided in the embodiments of this disclosure may be applied to a wireless communications system. FIG. 2 is a schematic architectural diagram of a wireless communications system according to an embodiment of this disclosure. As shown in FIG. 2, the wireless communications system may include a network device 20 and a terminal. The terminal is denoted as user equipment (UE) 21, and the UE 21 may communicate (transmit signaling or transmit data) with the network device 20. In practical applications, connection between the above devices may be a wireless connection. For ease of visually representing the connection relationship between the devices, a solid line is used to indicate that in FIG. 2. It should be noted that the foregoing communications system may include a plurality of UEs 21, and that the network device 20 may communicate with the plurality of UEs 21.

The terminal provided in this embodiment of this disclosure may be a mobile phone, a tablet computer, a notebook computer, an ultra-mobile personal computer (UMPC), a netbook, a personal digital assistant (PDA), a mobile Internet device (MID), a wearable device, a vehicle-mounted device, or the like.

The network device 20 provided in this embodiment of this disclosure may be a base station. The base station may be a commonly used base station or an evolved node base station (eNB), or may be a network device in a 5G system (for example, a next generation node base station (gNB) or a transmission and reception point (TRP), or the like.

Figure 3:
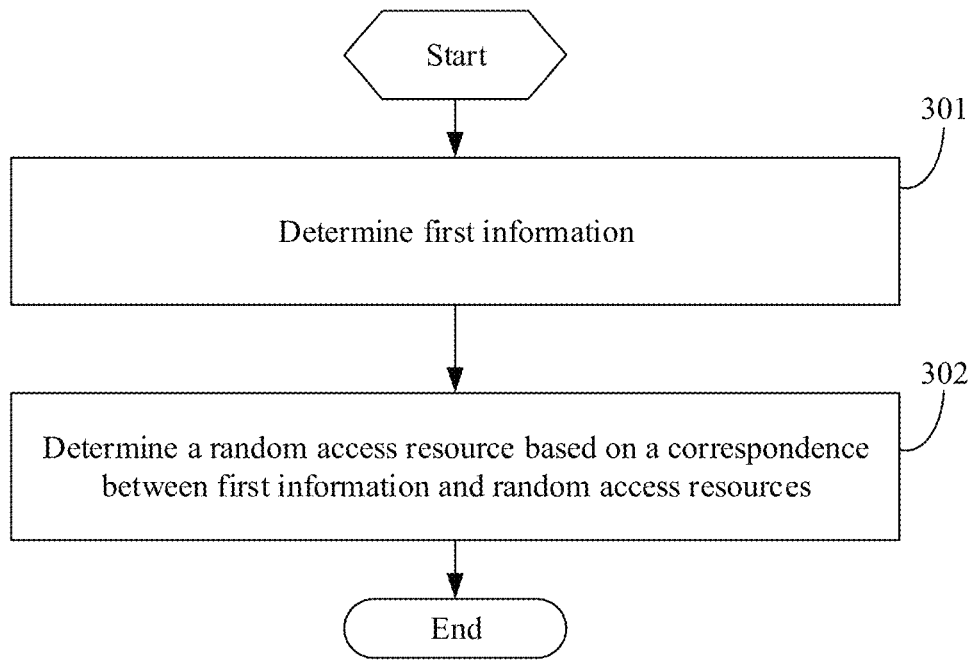
FIG. 3 is a first flowchart of a method for selecting a random access resource according to an embodiment of this disclosure.

Referring to FIG. 3, an embodiment of this disclosure provides a method for selecting a random access resource. The method may be performed by a terminal, and may include step 301 and step 302.

Step 301: Determine first information.

The first information may include any one of the following: a signal, an uplink carrier, or a random access procedure type. Further, the signal may include any one of the following: a reference signal, a cell measurement symbol, a cell measurement subframe, a cell measurement slot, a frequency measurement symbol, a frequency measurement subframe, or a frequency measurement slot.

Further, the reference signal may be a synchronization signal block (SSB) and/or a channel state information-reference signal (CSI-RS).

In this embodiment of this disclosure, optionally, the random access procedure type may be configured by a network side or prescribed by a protocol. Further, the random access procedure type includes any combination of one or more of the following: a 2-step random access procedure and a 4-step random access procedure.

Step 302: Determine a random access resource based on a correspondence between first information and random access resources.

In this embodiment of this disclosure, optionally, the correspondence between first information and random access resources may be configured by the network side or prescribed by a protocol.

In this embodiment of this disclosure, optionally, before step 301, one or more of the following may be configured by the network side or prescribed by a protocol:

(1) configuration information of an association relationship between random access resources and signals;
(2) a random access procedure type corresponding to a random access resource; and
(3) configuration of a measurement threshold of a signal used for selecting a random access resource.

Further, the configuration information of the association relationship may include a combination of one or more the following:

(a) a signal corresponding to a random access resource:
  optionally, the signal may include a combination of one or more of the following: an SSB, a CSI-RS, a cell measurement symbol, a cell measurement subframe, a cell measurement slot, a frequency measurement symbol, a frequency measurement subframe, and a frequency measurement slot; and
(b) random access resource allocation information:
  optionally, the random access resource allocation information may include a combination of one or more of the following: time occasion information, frequency occasion information, and code occasion information (for example, a random access preamble index).

Further, the configuration of the measurement threshold may include: a measurement threshold of the signal. Furthermore, the configuration of the measurement threshold may further include: a measurement type corresponding to the measurement threshold of the signal.

Optionally, the measurement type may include any one of the following:

(1) RSRP;
  for example, if an RSRP threshold of an SSB configured by the network side for the RACH procedure is −100 dBm, a PRACH resource corresponding to the SSB can be used as a candidate PRACH resource only when a measured result of the RSRP corresponding to the SSB exceeds −100 dBm;
(2) reference signal received quality (RSRQ);
(3) a received signal strength indicator (RSSI); or
(4) a channel occupancy ratio (CR).

Further, the measurement threshold of the signal may be used as a threshold for selecting a plurality of uplink carriers. For example, an RSRP measurement threshold of two uplink carriers for cell 1 is −80 dBm. In a case that a measured result of RSRP for cell 1 exceeds the threshold, uplink carrier 1 for cell 1 is selected; otherwise, uplink carrier 2 for cell 1 is selected. Alternatively, different signals have different thresholds. For example, an RSRP threshold of an SSB for cell 1 is −80 dBm, and an RSRP threshold of a CSI-RS for cell 1 is −100 dBm.

Further, different random access procedure types have different thresholds. For example, an RSRP threshold of an SSB in a 2-step random access procedure is −80 dBm, and an RSRP threshold of an SSB in a 4-step random access procedure is −100 dBm.

In this embodiment of this disclosure, optionally, after step 302, the method may further include: if the first information is a random access procedure type, and the random access procedure type is 2-step random access procedure, receiving a random access response after transmitting data carried by a data channel, which means the terminal receives a random access response after transmitting a data channel For example, a random access response (RAR) reception window timer is started after the data carried by the data channel is transmitted.

Further, the starting an RAR reception window timer after transmitting the data carried by the data channel may include any one of the following:

(1) after transmitting a request message carried by a physical uplink shared channel (Physical Uplink Shared Channel, PUSCH), starting the RAR reception window timer at a first physical downlink control channel (PDCCH) occasion configured for RAR reception; or
(2) starting the RAR reception window timer at an end boundary of transmission of a request message carried by a PUSCH.

For example, after transmitting MsgA carried by the PUSCH channel, the terminal starts the RAR reception window timer (ra-ResponseWindow) at the first PDCCH occasion configured for RAR reception.

For another example, after transmitting MsgA carried by the PUSCH channel, the terminal starts the RAR reception window timer, that is, starts the RAR reception window timer at the end boundary of transmission of MsgA on the PUSCH channel.

In this embodiment of this disclosure, when random access resources include both random access resources used in a 2-step random access procedure and a 4-step random access procedure, the terminal can select a random access resource based on any one of a signal, an uplink carrier, and a random access procedure type, enhancing reliability of the random access procedure.

Figure 4:
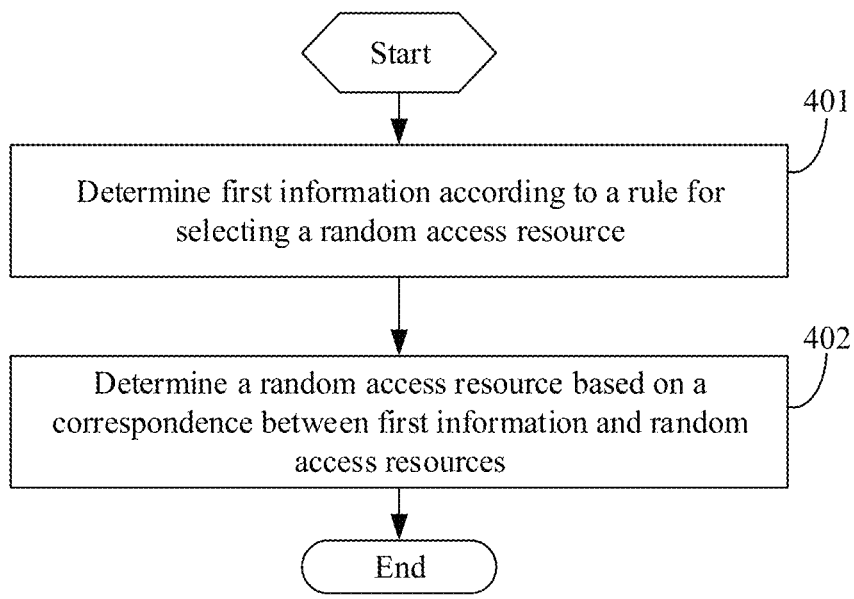
FIG. 4 is a second flowchart of a method for selecting a random access resource according to an embodiment of this disclosure.

Referring to FIG. 4, an embodiment of this disclosure provides a method for selecting a random access resource. The method may be performed by a terminal, and may include step 401 and step 402.

Step 401: Determine (or select) first information according to a rule for selecting a random access resource.

The first information may include any one of the following: a signal, an uplink carrier, or a random access procedure type. Further, the signal may include any one of the following: a reference signal, a cell measurement symbol, a cell measurement subframe, a cell measurement slot, a frequency measurement symbol, a frequency measurement subframe, or a frequency measurement slot.

Further, the reference signal may be an SSB and/or a CSI-RS.

In this embodiment of this disclosure, optionally, the random access procedure type may be configured by a network side or prescribed by a protocol. Further, the random access procedure type includes any combination of one or more of the following: a 2-step random access procedure and a 4-step random access procedure.

Step 402: Determine (or select) a random access resource based on a correspondence between first information and random access resources.

In this embodiment of this disclosure, optionally, the correspondence between first information and random access resources may be configured by the network side or prescribed by a protocol.

In this embodiment of this disclosure, optionally, before step 401, one or more of the following may be configured by the network side or prescribed by a protocol:

(1) configuration information of an association relationship between random access resources and signals;

(2) a random access procedure type corresponding to a random access resource; and (3) configuration of a measurement threshold of a signal used for selecting a random access resource.

Further, the configuration information of the association relationship may include a combination of one or more the following:

(a) a signal corresponding to a random access resource:

(b) random access resource allocation information:

In this embodiment of this disclosure, optionally, after step 402, the method may further include: if the first information is a random access procedure type, and the random access procedure type is 2-step random access procedure, receiving a random access response after transmitting data carried by a data channel, which means the terminal receives a random access response after transmitting a data channel In an embodiment of this disclosure, optionally, the rule for selecting a random access resource may include any combination of one or more of the following:

(1) An uplink carrier is determined according to a rule for selecting an uplink carrier, and a random access procedure type is determined according to the uplink carrier and a rule for selecting a random access procedure type. In other words, an uplink carrier is selected first, and then a random access procedure type is selected, which is referred to as Rule 1.1 below.

Further, in a case that random access resources are configured on a plurality of uplink carriers corresponding to a cell (and a rule for selecting a random access resource is configured for a plurality of uplink carriers), and that at least two random access procedure types are configured for the random access resources (and a rule for selecting a random access procedure type is configured), the terminal may determine an uplink carrier according to the rule for selecting an uplink carrier, and then determine a random access procedure type according to the uplink carrier and the rule for selecting a random access procedure type, where the random access resource corresponding to the random access procedure type is on the uplink carrier.

For example, the rule for selecting a random access resource that is configured by the network side or prescribed by a protocol for a plurality of uplink carriers is performing selection based on a measurement threshold of a signal. For example, a measurement threshold is −80 dBm. The rule for selecting a random access procedure type that is configured by the network side or prescribed by a protocol is performing selection based on a size of data in uplink transmission. For example, a size threshold of uplink data in a random access procedure is 56 bits.

In the random access procedure of the terminal, an RSRP measurement value of uplink carrier 1 for the terminal is −60 dBm, and a size of MsgA or Msg3 in the random access procedure of the terminal is 50 bits. The terminal first selects, according to the rule for selecting a random access resource for a plurality of uplink carriers, uplink carrier 1 for transmitting a random access signal, and then selects a new 2-step random access procedure as the random access procedure according to the rule for selecting a random access procedure type.

(2) A random access procedure type is determined according to a rule for selecting a random access procedure type, and an uplink carrier is determined according to the random access procedure type and a rule for selecting an uplink carrier. In other words, a random access procedure type is selected first, and then an uplink carrier is selected, which is referred to as Rule 1.2 below.

Further, in a case that random access resources are configured on a plurality of uplink carriers corresponding to a cell (and a rule for selecting a random access resource is configured for a plurality of uplink carriers), and that at least two random access procedure types are configured for the random access resources (and a rule for selecting a random access procedure type is configured), the terminal may determine a random access procedure type according to the rule for selecting a random access procedure type, and then determine an uplink carrier according to the random access procedure type and the rule for selecting an uplink carrier, where the random access resource corresponding to the random access procedure type is on the uplink carrier.

For example, the rule for selecting a random access resource that is configured by the network side or prescribed by a protocol for a plurality of uplink carriers is performing selection based on a measurement threshold of a signal. For example, a measurement threshold is −80 dBm. The rule for selecting a random access procedure type that is configured by the network side or prescribed by a protocol is performing selection based on a size of data in uplink transmission. For example, a size threshold of uplink data in a random access procedure is 56 bits.

In the random access procedure of the terminal, a size of MsgA or Msg3 is 50 bits, and the RSRP measurement value of uplink carrier 1 for the terminal is −60 dBm. The terminal first selects a 2-step random access procedure as the random access procedure according to the rule for selecting a random access procedure type. Then the terminal selects, according to the rule for selecting a random access resource for the plurality of uplink carriers, uplink carrier 1 for transmitting a random access signal.

It should be noted that Rule 1.1 and Rule 1.2 are alternative rules. In other words, the terminal may select one of Rule 1.1 and Rule 1.2 to determine the first information.

(3) A signal is determined according to a rule for selecting a signal, and a random access procedure type is determined according to the signal and a rule for selecting a random access procedure type. In other words, a signal is selected first, and then a random access procedure type is selected, which is referred to as Rule 2.1 below.

Further, in a case that corresponding signals are configured for random access resources (and a rule for selecting a signal is configured), and that at least two random access procedure types are configured for the random access resource (and a rule for selecting a random access procedure type is configured), the terminal may determine a signal according to the rule for selecting a signal, and then determine a random access procedure type according to the signal and the rule for selecting a random access procedure type, where the random access resource corresponding to the random access procedure type corresponds to the signal.

For example, the rule for selecting a signal that is configured by the network side or prescribed by a protocol is performing selection based on a measurement threshold of an SSB signal. For example, a measurement threshold is −80 dBm. The rule for selecting a random access procedure type that is configured by the network side or prescribed by a protocol is performing selection based on a size of data in uplink transmission. For example, a size threshold of uplink data in a random access procedure is 56 bits.

In the random access procedure of the terminal, an RSRP measurement value of SSB1 for cell 1 that is measured by the terminal is −60 dBm, and a size of MsgA or Msg3 is 50 bits. The terminal first selects the SSB1 corresponding to the random access resource according to the rule for selecting a signal, and then selects a 2-step random access procedure as the random access procedure according to the rule for selecting a random access procedure type.

(4) A random access procedure type is determined according to a rule for selecting a random access procedure type, and a signal is determined according to the random access procedure type and the rule for selecting a signal. In other words, a random access procedure type is selected first, and then a signal is selected, which is referred to as Rule 2.2 below.

Further, in a case that corresponding signals are configured for random access resources (and a rule for selecting a signal is configured), and that at least two random access procedure types are configured for the random access resource (and a rule for selecting a random access procedure type is configured), the terminal may determine a random access procedure type according to the rule for selecting a random access procedure type, and then determine a signal according to the random access procedure type and the rule for selecting a signal, where the random access resource corresponding to the random access procedure type corresponds to the signal.

For example, the rule for selecting a signal that is configured by the network side or prescribed by a protocol is performing selection based on a measurement threshold of an SSB signal. For example, a measurement threshold is −80 dBm. The rule for selecting a random access procedure type that is configured by the network side or prescribed by a protocol is performing selection based on a size of data in uplink transmission. For example, a size threshold of uplink data in a random access procedure is 56 bits.

In the random access procedure of the terminal, a size of MsgA or Msg3 is 50 bits, and an RSRP measurement value of SSB1 for cell 1 that is measured by the terminal is −60 dBm. The terminal first selects a 2-step random access procedure as the random access procedure according to the rule for selecting a random access procedure type. Then the terminal selects SSB1 according to the rule for selecting a signal.

It should be noted that Rule 2.1 and Rule 2.2 are alternative rules. In other words, the terminal may select one of Rule 2.1 and Rule 2.2 to determine the first information.

Further, the rule for selecting a random access resource for an uplink carrier may include selecting an uplink carrier based on a measurement threshold of a signal.

For example, an RSRP measurement threshold of two uplink carriers (uplink carrier 1 and uplink carrier 2) for cell 1 is −80 dBm. In a case that an RSRP measurement result for cell 1 exceeds the threshold, uplink carrier 1 is selected; otherwise, uplink carrier 2 is selected.

Further, the rule for selecting a signal may include selecting a signal based on a measurement threshold of a signal.

For example, an RSRP measurement threshold of SSB1 for cell 1 is −80 dBm. In a case that a measurement result of SSB1 for cell 1 exceeds the threshold, SSB1 is selected, which means a random access resource corresponding to SSB1 is used as a candidate random access resource.

Further, the rule for selecting a random access procedure type may include any combination of one or more of the following:

(1) A random access procedure type is selected based on a measurement threshold of a signal.

For example, the random access procedure type is selected based on an RSRP threshold (for example, −80 dBm) for cell 1 (or SSB1 or CSI-RS1) that is configured by the network side or prescribed by a protocol. In a case that an RSRP measurement result for cell 1 (or SSB1 or CSI-RS1) exceeds −80 dBm, the terminal selects a 2-step random access procedure (or referred to as a new 2-step random access procedure); otherwise, the terminal selects a 4-step random access procedure.

(2) A random access procedure type is selected based on a size of data in uplink transmission.

For example, the random access procedure type is selected based on a size threshold (for example, 56 bits) of data in uplink transmission in a random access procedure for cell 1 that is configured by the network side or prescribed by a protocol. In a case that a size of a connection establishment access request message transmitted by the terminal in a random access procedure (or MsgA in a 2-step random access procedure or Msg3 in a 4-step random access procedure) is less than or equal to the threshold, the terminal selects the 2-step random access procedure; otherwise, the terminal selects the 4-step random access procedure.

(3) A random access procedure type is selected based on a measurement threshold of a signal and a size of data in uplink transmission.

For example, the random access procedure type is selected based on an RSRP threshold (for example, −80 dBm) for cell 1 (or SSB1 or CSI-RS1) and a size threshold (for example, 56 bits) of uplink data transmitted in a random access procedure for cell 1 that is configured by the network side or prescribed by a protocol. In a case that an RSRP measurement threshold for cell 1 (or SSB1 or CSI-RS1) in a random access procedure of the terminal exceeds −80 dBm, and a size of a connection establishment access request message transmitted by the terminal in the random access procedure (or MsgA in a 2-step random access procedure or Msg3 in a 4-step random access procedure) is less than or equal to the threshold, the terminal selects the 2-step random access procedure; otherwise, the terminal selects the 4-step random access procedure.

(4) A random access procedure type is selected based on a random number.

For example, the terminal generates a random number between "0" and "1". In a case that the random number is less than a threshold (for example, 0.5), the terminal selects a 2-step random access procedure; otherwise, the terminal selects a 4-step random access procedure.

(5) A random access procedure type is selected based on a designated preferred random access procedure type.

For example, the terminal preferentially selects the 2-step random access procedure for cell 1 in an unlicensed band according to the configuration by the network side or the protocol.

Further, selecting the 2-step random access procedure means that the random access request message (that is, MsgA) of the random access procedure may include one or more of the following: a transmission resource for random access request data information; a transmission resource (for example, a PRACH resource and a PUSCH resource) for a random access request control message; a signal (for example, an SSB or a CSI-RS) corresponding to a transmission resource; and an uplink carrier corresponding to a transmission resource.

Further, selecting the 4-step random access procedure means that the random access request message (that is, Msg1) of the random access procedure is transmission of a random access preamble (for example, a PRACH), including a selected Msg1 transmission resource (for example, a PRACH resource) configured for the 4-step random access procedure, and/or a signal (for example, an SSB or a CSI-RS) or an uplink carrier corresponding to the transmission resource.

In another embodiment of this disclosure, optionally, the rule for selecting a random access resource may include any combination of one or more of the following:

(1) An uplink carrier is determined according to a rule for selecting an uplink carrier, a signal is determined according to the uplink carrier and a rule for selecting a signal, and a random access procedure type is determined according to the signal and a rule for selecting a random access procedure type, which are equivalent to Rule 1.1+Rule 2.1.

(2) An uplink carrier is determined according to a rule for selecting an uplink carrier, a random access procedure type is determined according to the uplink carrier and a rule for selecting a random access procedure type, and a signal is determined according to the signal and a rule for selecting a signal, which are equivalent to Rule 1.1+Rule 2.2.

(3) A signal is determined according to a rule for selecting a signal, a random access procedure type is determined according to the signal and a rule for selecting a random access procedure type, and an uplink carrier is determined according to the random access procedure type and a rule for selecting an uplink carrier, which are equivalent to Rule 1.2+Rule 2.1.

(4) A random access procedure type is determined according to a rule for selecting a random access procedure type, an uplink carrier is determined according to the random access procedure type and a rule for selecting an uplink carrier, and a signal is determined according to the uplink carrier and a rule for selecting a signal; or a random access procedure type is determined according to a rule for selecting a signal, a signal is determined according to the random access procedure type and a rule for selecting a signal, and an uplink carrier is determined according to the signal and a rule for selecting an uplink carrier, which are equivalent to Rule 1.2+Rule 2.1.

It can be understood that for the descriptions of the rule for selecting an uplink carrier, the rule for selecting a signal, and the rule for selecting a random access procedure type, reference may be made to the previous descriptions, which are not repeated herein.

Further, for Rule 1.1, in a case that a plurality of carriers are selected by the terminal according to the rule for selecting a random access resource for the plurality of uplink carriers, for example, the terminal is configured with three uplink carriers, an RSRP measurement threshold for a cell is −80 dBm, and an RSRP measurement result for the cell that is obtained by the terminal is −60 dBm, there are two uplink carriers that exceed the threshold and can be used for transmission of a random access signal. In another embodiment of this disclosure, optionally, the rule for selecting a random access resource may include any combination of one or more of the following:

(1) A random access procedure type is determined according to a rule for selecting a random access procedure type, and one uplink carrier is selected from a plurality of uplink carriers for a random access resource corresponding to the random access procedure type, where the random access resource corresponding to the random access procedure type is on the selected uplink carrier.

(2) A plurality of uplink carriers are determined according to a rule for selecting an uplink carrier, one uplink carrier is selected from the plurality of uplink carriers, and a random access procedure type is determined according to the uplink carrier and a rule for selecting a random access procedure type, where random access resources corresponding to the random access procedure type are on the selected uplink carrier.

Further, for Rule 1.2, the random access resource corresponding to the random access procedure type selected by the terminal according to the rule for selecting a random access procedure type corresponds to one uplink carrier. In still another embodiment of this disclosure, optionally, the rule for selecting a random access resource includes: determining a random access procedure type according to a rule for selecting a random access procedure type.

That is, the terminal no longer executes "the rule for selecting a random access resource for a plurality of uplink carriers". For example, if random access resources corresponding to the 2-step random access procedure, selected by the terminal, are all on uplink carrier 1, the terminal no longer executes the rule for selecting an uplink carrier in this case. This can avoid that the random access procedure fails in a case that the terminal does not select uplink carrier 1 because a measurement result for cell 1 that is measured by the terminal is less than the threshold.

Further, for Rule 2.1, in a case that the terminal selects a plurality of signals according to the rule for selecting a signal, for example, the terminal configures random access resources corresponding to three SSBs and there are two SSBs that exceed the RSRP threshold, the terminal selects two of the SSBs. In still another embodiment of this disclosure, optionally, the rule for selecting a random access resource may include a combination of one or more of the following:

(1) A random access procedure type is determined according to a rule for selecting a random access procedure type, a plurality of signals corresponding to random access resources corresponding to the random access procedure type are determined, and one signal is selected from the plurality of signals, where the random access resources corresponding to the random access procedure type correspond to signals.

(2) A plurality of uplink carriers are determined according to a rule for selecting an uplink carrier, one uplink carrier is selected from the plurality of uplink carriers, and a random access procedure type is determined according to the uplink carrier and a rule for selecting a random access procedure type, where random access resources corresponding to the random access procedure type correspond to signals.

If the signal is used for only one random access procedure type, for example, used for only the 2-step random access procedure, the terminal may no longer perform selection according to the rule for selecting a random access procedure type. This can avoid that the random access procedure fails because the terminal cannot select a random access resource corresponding to a signal according to the rule for selecting a random access procedure type.

Further, for Rule 2.2, the random access resource corresponding to the random access procedure type selected by the terminal according to the rule for selecting a random access procedure type corresponds to one signal. In still another embodiment of this disclosure, optionally, the rule for selecting a random access resource may include: determining a random access procedure type according to a rule for selecting a random access procedure type.

That is, the terminal no longer executes the rule for selecting a signal. For example, if a random access resource corresponding to the 2-step random access procedure selected by the terminal corresponds to SSB1, the terminal no longer executes the rule for selecting a signal in this case. This can avoid that the random access procedure fails in a case that the terminal does not select SSB 1 because a measurement result of SSB 1 for cell 1 that is measured by the terminal is less than the threshold.

Furthermore, if the terminal cannot select any uplink carrier according to the foregoing selection Rule 1.1 or 1.2 (for example, due to a rule conflict) in a case that the random access resources are configured on a plurality of uplink carriers, the terminal first selects uplink carrier 1 according to the rule for selecting an uplink carrier, but the random access resources corresponding to the random access procedure type selected by the terminal by executing the rule for selecting a random access procedure type are not on uplink carrier 1. In still another embodiment of this disclosure, optionally, the rule for selecting a random access resource may include any combination of one or more of the following:

(1) An uplink carrier is determined according to a rule for selecting an uplink carrier, a random access procedure type is determined according to a rule for selecting a random access procedure type, and if no random access resource corresponding to the random access procedure type is on the uplink carrier, another uplink carrier is determined according to the rule for selecting an uplink carrier, which means the previous uplink carrier selection result is ignored, and another uplink carrier is selected.

(2) An uplink carrier is determined according to a rule for selecting an uplink carrier, a random access procedure type is determined according to a rule for selecting a random access procedure type, and if no random access resource corresponding to the random access procedure type is on the uplink carrier, another random access procedure type is determined according to the rule for selecting a random access procedure type.

(3) An uplink carrier is determined according to a rule for selecting an uplink carrier, a random access procedure type is determined according to a rule for selecting a random access procedure type, and if no random access resource corresponding to the random access procedure type is on the uplink carrier, another uplink carrier, for example, an uplink carrier corresponding to any contention-based random access resource, is selected.

(4) An uplink carrier is determined according to a rule for selecting an uplink carrier, a random access procedure type is determined according to a rule for selecting a random access procedure type, and if no random access resource corresponding to the random access procedure type is on the uplink carrier, another random access procedure type is selected.

(5) An uplink carrier is determined according to a rule for selecting an uplink carrier, a random access procedure type is determined according to a rule for selecting a random access procedure type, and if random access resources corresponding to only one random access procedure type are on the uplink carrier, the random access procedure type corresponding to the uplink carrier is selected.

Furthermore, if the terminal cannot select any random access procedure type according to the foregoing selection Rule 1.1 or 1.2 (for example, due to a rule conflict) in a case that the random access resources are configured on a plurality of uplink carriers, the terminal first selects uplink carrier 1 according to the rule for selecting an uplink carrier, but the random access resources corresponding to the random access procedure type selected by the terminal by executing the rule for selecting a random access procedure type are not on uplink carrier 1. In still another embodiment of this disclosure, optionally, the rule for selecting a random access resource includes any combination of one or more of the following:

(1) A random access procedure type is determined according to a rule for selecting a random access procedure type, an uplink carrier is determined according to a rule for selecting an uplink carrier, and if no random access resource corresponding to the random access procedure type is on the uplink carrier, another uplink carrier is determined according to the rule for selecting an uplink carrier.

(2) A random access procedure type is determined according to a rule for selecting a random access procedure type, an uplink carrier is determined according to a rule for selecting an uplink carrier, and if no random access resource corresponding to the random access procedure type is on the uplink carrier, another random access procedure type is determined according to the rule for selecting a random access procedure type.

(3) A random access procedure type is determined according to a rule for selecting a random access procedure type, an uplink carrier is determined according to a rule for selecting an uplink carrier, and if no random access resource corresponding to the random access procedure type is on the uplink carrier, another uplink carrier is selected.

(4) A random access procedure type is determined according to a rule for selecting a random access procedure type, an uplink carrier is determined according to a rule for selecting an uplink carrier, and if no random access resource corresponding to the random access procedure type is on the uplink carrier, another random access procedure type, for example, a random access procedure type corresponding to any contention-based random access resource, is selected.

(5) A random access procedure type is determined according to a rule for selecting a random access procedure type, an uplink carrier is determined according to a rule for selecting an uplink carrier, and if random access resources corresponding to the random access procedure type are only on one uplink carrier, the uplink carrier is selected.

Further, if the terminal cannot select any signal according to the foregoing selection Rule 2.1 or 2.2 (for example, due to a rule conflict) in a case that the corresponding signals are configured for random access resources, the terminal first selects SSB 1 according to the rule for selecting a signal, but the random access resources corresponding to the random access procedure type selected by the terminal by executing the rule for selecting a random access procedure type do not correspond to SSB 1. In still another embodiment of this disclosure, optionally, the rule for selecting a random access resource may include any combination of one or more of the following:

(1) A signal is determined according to a rule for selecting a signal, a random access procedure type is determined according to a rule for selecting a random access procedure type, and if no random access resource corresponding to the random access procedure type corresponds to the signal, another signal is determined according to the rule for selecting a signal, which means the previous selection result is ignored, and another signal corresponding to a random access resource is selected.

(2) A signal is determined according to a rule for selecting a signal, a random access procedure type is determined according to a rule for selecting a random access procedure type, and if no random access resource corresponding to the random access procedure type corresponds to the signal, another random access procedure type is determined according to the rule for selecting a random access procedure type, which means the previous selection result is ignored, and another random access procedure type is selected.

(3) A signal is determined according to a rule for selecting a signal, a random access procedure type is determined according to a rule for selecting a random access procedure type, and if no random access resource corresponding to the random access procedure type corresponds to the signal, a signal corresponding to a random access resource, for example, a signal corresponding to any contention-based random access resource, is selected.

(4) A signal is determined according to a rule for selecting a signal, a random access procedure type is determined according to a rule for selecting a random access procedure type, and if no random access resource corresponding to the random access procedure type corresponds to the signal, another random access procedure type is selected.

(5) A signal is determined according to a rule for selecting a signal, a random access procedure type is determined according to a rule for selecting a random access procedure type, and if the signal corresponds to only one random access procedure type, the random access procedure type is selected.

Further, if the terminal cannot select any random access procedure type according to the foregoing selection Rule 2.1 or 2.2 (for example, due to a rule conflict) in a case that the corresponding signals are configured for random access resources, the terminal first selects SSB1 according to the rule for selecting a signal, but the random access resources corresponding to the random access procedure type selected by the terminal by executing the rule for selecting a random access procedure type do not correspond to SSB1. In still another embodiment of this disclosure, optionally, the rule for selecting a random access resource includes any combination of one or more of the following:

(1) A random access procedure type is determined according to a rule for selecting a random access procedure type, a signal is determined according to a rule for selecting a signal, and if no random access resource corresponding to the random access procedure type corresponds to the signal, another signal is determined according to the rule for selecting a signal, which means the previous selection result is ignored, and another signal corresponding to a random access resource is selected.

(2) A random access procedure type is determined according to a rule for selecting a random access procedure type, a signal is determined according to a rule for selecting a signal, and if no random access resource corresponding to the random access procedure type corresponds to the signal, another random access procedure type is determined according to the rule for selecting a random access procedure type, which means the previous selection result is ignored, and another random access procedure type is selected.

(3) A random access procedure type is determined according to a rule for selecting a random access procedure type, a signal is determined according to a rule for selecting a signal, and if no random access resource corresponding to the random access procedure type corresponds to the signal, a signal corresponding to a random access resource is selected.

(4) A random access procedure type is determined according to a rule for selecting a random access procedure type, a signal is determined according to a rule for selecting a signal, and if no random access resource corresponding to the random access procedure type corresponds to the signal, another random access procedure type, for example, a random access procedure type corresponding to any contention-based random access resource, is selected.

(5) A random access procedure type is determined according to a rule for selecting a random access procedure type, a signal is determined according to a rule for selecting a signal, and if random access resources corresponding to the random access procedure type correspond to only one signal, the signal is selected.

In this embodiment of this disclosure, when the network side configures that random access resources include both random access resources used in a 2-step random access procedure and random access resources used in a 4-step random access procedure, the terminal can select a random access resource based on any one of a signal, an uplink carrier, and a random access procedure type, enhancing reliability of a random access procedure.

An embodiment of this disclosure further provides a terminal. Because a problem-resolving principle of the terminal is similar to that of the method for selecting a random access resource in the embodiments of this disclosure, for implementation of the terminal, refer to the implementation of the method. Details are not described herein again.

Figure 5:
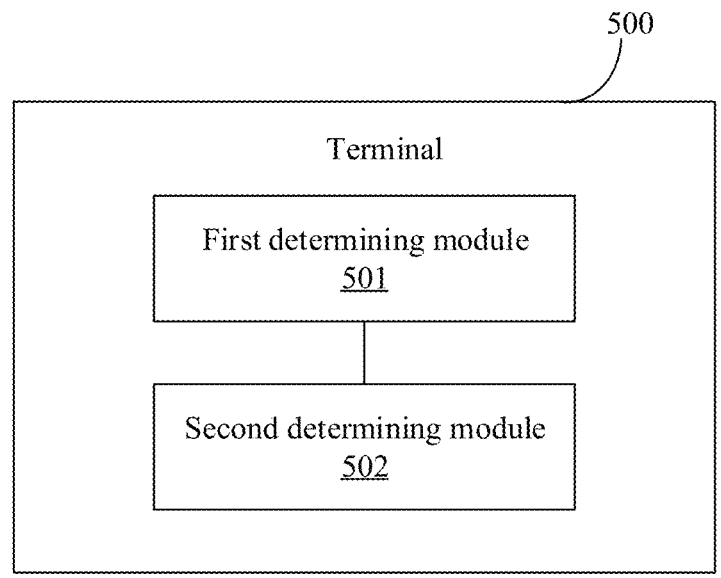
FIG. 5 is a first schematic structural diagram of a terminal according to an embodiment of this disclosure.

Referring to FIG. 5, an embodiment of this disclosure further provides a terminal. The terminal 500 includes:
 a first determining module 501, configured to determine first information; and
 a second determining module 502, configured to determine a random access resource based on a correspondence between first information and random access resources; where
 the first information includes any one of the following: a signal, an uplink carrier, or a random access procedure type.

In this embodiment of this disclosure, optionally, the terminal further includes:
 a receiving module, configured to, in a case that the first information is a random access procedure type, and the random access procedure type is 2-step random access procedure, receive a random access response after data carried by a data channel is transmitted.

In this embodiment of this disclosure, optionally, the receiving module is further configured to start a random access response RAR reception window timer after the data carried by the data channel is transmitted.

In this embodiment of this disclosure, optionally, the starting an RAR reception window timer after the data carried by the data channel is transmitted may include any one of the following:

after transmitting a request message carried by a physical uplink shared channel PUSCH, starting the RAR reception window timer at a first physical downlink control channel PDCCH occasion configured for RAR reception; or starting the RAR reception window timer at an end boundary of transmission of a request message carried by a PUSCH.

In this embodiment of this disclosure, optionally, the first determining module 501 is further configured to determine the first information according to a rule for selecting a random access resource.

In this embodiment of this disclosure, optionally, the rule for selecting a random access resource includes at least one of the following:

determining an uplink carrier according to a rule for selecting an uplink carrier, and determining a random access procedure type according to the uplink carrier and a rule for selecting a random access procedure type;

determining a random access procedure type according to a rule for selecting a random access procedure type, and determining an uplink carrier according to the random access procedure type and a rule for selecting an uplink carrier;

determining a signal according to a rule for selecting a signal, and determining a random access procedure type according to the signal and a rule for selecting a random access procedure type; or determining a random access procedure type according to a rule for selecting a random access procedure type, and determining a signal according to the random access procedure type and a rule for selecting a signal.

In this embodiment of this disclosure, optionally, the determining the first information according to a rule for selecting a random access resource includes any one of the following:

in a case that random access resources are configured on a plurality of uplink carriers corresponding to a cell, and that at least two random access procedure types are configured for the random access resources, determining an uplink carrier according to a rule for selecting an uplink carrier, and determining a random access procedure type according to the uplink carrier and a rule for selecting a random access procedure type; or in a case that random access resources are configured on a plurality of uplink carriers corresponding to a cell, and that at least two random access procedure types are configured for the random access resources, determining a random access procedure type according to a rule for selecting a random access procedure type, and determining an uplink carrier according to the random access procedure type and a rule for selecting an uplink carrier.

In this embodiment of this disclosure, optionally, the determining the first information according to a rule for selecting a random access resource includes any one of the following:

in a case that corresponding signals are configured for random access resources, and that at least two random access procedure types are configured for the random access resources, determining a signal according to a rule for selecting a signal, and determining a random access procedure type according to the signal and a rule for selecting a random access procedure type; or in a case that corresponding signals are configured for random access resources, and that at least two random access procedure types are configured for the random access resources, determining a random access procedure type according to a rule for selecting a random access procedure type, and determining a signal according to the random access procedure type and a rule for selecting a signal.

In this embodiment of this disclosure, optionally, the rule for selecting a random access resource includes at least one of the following:

determining an uplink carrier according to a rule for selecting an uplink carrier, determining a signal according to the uplink carrier and a rule for selecting a signal, and determining a random access procedure type according to the signal and a rule for selecting a random access procedure type;

determining an uplink carrier according to a rule for selecting an uplink carrier, determining a random access procedure type according to the uplink carrier and a rule for selecting a random access procedure type, and determining a signal according to the random access procedure type and a rule for selecting a signal;

determining a signal according to a rule for selecting a signal, determining a random access procedure type according to the signal and a rule for selecting a random access procedure type, and determining an uplink carrier according to the random access procedure type and a rule for selecting an uplink carrier;

determining a random access procedure type according to a rule for selecting a signal, determining an uplink carrier according to the random access procedure type and a rule for selecting an uplink carrier, and determining a signal according to the uplink carrier and a rule for selecting a signal; or determining a random access procedure type according to a rule for selecting a signal, determining a signal according to the random access procedure type and a rule for selecting a signal, and determining an uplink carrier according to the signal and a rule for selecting an uplink carrier.

In this embodiment of this disclosure, optionally, the rule for selecting a random access resource includes at least one of the following:

determining a random access procedure type according to a rule for selecting a random access procedure type, and selecting one uplink carrier from a plurality of uplink carriers corresponding to random access resources corresponding to the random access procedure type;

determining a plurality of uplink carriers according to a rule for selecting an uplink carrier, selecting one uplink carrier from the plurality of uplink carriers, and determining a random access procedure type according to the uplink carrier and a rule for selecting a random access procedure type; or determining a random access procedure type according a rule for selecting a random access procedure type.

In this embodiment of this disclosure, optionally, the rule for selecting a random access resource includes at least one of the following:

determining a random access procedure type according to a rule for selecting a random access procedure type, determining a plurality of signals corresponding to random access resources corresponding to the random access procedure type, and selecting one signal from the plurality of signals; or determining a plurality of uplink carriers according to a rule for selecting an uplink carrier, selecting one uplink carrier from the plurality of uplink carriers, and determining a random access procedure type according to the uplink carrier and a rule for selecting a random access procedure type.

In this embodiment of this disclosure, optionally, the rule for selecting a random access resource includes at least one of the following:
  determining an uplink carrier according to a rule for selecting an uplink carrier, determining a random access procedure type according to a rule for selecting a random access procedure type, and if no random access resource corresponding to the random access procedure type is on the uplink carrier, determining another uplink carrier according to the rule for selecting an uplink carrier;
  determining an uplink carrier according to a rule for selecting an uplink carrier, determining a random access procedure type according to a rule for selecting a random access procedure type, and if no random access resource corresponding to the random access procedure type is on the uplink carrier, determining another random access procedure type according to the rule for selecting a random access procedure type;
  determining an uplink carrier according to a rule for selecting an uplink carrier, determining a random access procedure type according to a rule for selecting a random access procedure type, and if no random access resource corresponding to the random access procedure type is on the uplink carrier, selecting another uplink carrier;
  determining an uplink carrier according to a rule for selecting an uplink carrier, determining a random access procedure type according to a rule for selecting a random access procedure type, and if no random access resource corresponding to the random access procedure type is on the uplink carrier, selecting another random access procedure type; or
  determining an uplink carrier according to a rule for selecting an uplink carrier, determining a random access procedure type according to a rule for selecting a random access procedure type, and if only random access resources corresponding to one random access procedure type are on the uplink carrier, selecting the random access procedure type corresponding to the uplink carrier.

In this embodiment of this disclosure, optionally, the rule for selecting a random access resource includes at least one of the following:
  determining a random access procedure type according to a rule for selecting a random access procedure type, determining an uplink carrier according to a rule for selecting an uplink carrier, and if no random access resource corresponding to the random access procedure type is on the uplink carrier, determining another uplink carrier according to the rule for selecting an uplink carrier;
  determining a random access procedure type according to a rule for selecting a random access procedure type, determining an uplink carrier according to a rule for selecting an uplink carrier, and if no random access resource corresponding to the random access procedure type is on the uplink carrier, determining another random access procedure type according to the rule for selecting a random access procedure type;
  determining a random access procedure type according to a rule for selecting a random access procedure type, determining an uplink carrier according to a rule for selecting an uplink carrier, and if no random access resource corresponding to the random access procedure type is on the uplink carrier, selecting another uplink carrier;
  determining a random access procedure type according to a rule for selecting a random access procedure type, determining an uplink carrier according to a rule for selecting an uplink carrier, and if no random access resource corresponding to the random access procedure type is on the uplink carrier, selecting another random access procedure type; or
  determining a random access procedure type according to a rule for selecting a random access procedure type, determining an uplink carrier according to a rule for selecting an uplink carrier, and if random access resources corresponding to the random access procedure type are only on one uplink carrier, selecting the uplink carrier.

In this embodiment of this disclosure, optionally, the rule for selecting a random access resource includes at least one of the following:
  determining a signal according to a rule for selecting a signal, determining a random access procedure type according to a rule for selecting a random access procedure type, and if no random access resource corresponding to the random access procedure type corresponds to the signal, determining another signal according to the rule for selecting a signal;
  determining a signal according to a rule for selecting a signal, determining a random access procedure type according to a rule for selecting a random access procedure type, and if no random access resource corresponding to the random access procedure type corresponds to the signal, determining another random access procedure type according to the rule for selecting a random access procedure type;
  determining a signal according to a rule for selecting a signal, determining a random access procedure type according to a rule for selecting a random access procedure type, and if no random access resource corresponding to the random access procedure type corresponds to the signal, selecting a signal corresponding to a random access resource;
  determining a random access procedure type according to a rule for selecting a random access procedure type, determining an uplink carrier according to a rule for selecting an uplink carrier, and if no random access resource corresponding to the random access procedure type is on the uplink carrier, selecting another uplink carrier; or
  determining a signal according to a rule for selecting a signal, determining a random access procedure type according to a rule for selecting a random access procedure type, and if the signal corresponds to only one random access procedure type, selecting the random access procedure type.

In this embodiment of this disclosure, optionally, the rule for selecting a random access resource includes at least one of the following:
  determining a random access procedure type according to a rule for selecting a random access procedure type, determining a signal according to a rule for selecting a signal, and if no random access resource corresponding to the random access procedure type corresponds to the signal, determining another signal according to the rule for selecting a signal;
  determining a random access procedure type according to a rule for selecting a random access procedure type, determining a signal according to a rule for selecting a signal, and if no random access resource corresponding to the random access procedure type corresponds to the signal, determining another random access procedure type according to the rule for selecting a random access procedure type;

determining a random access procedure type according to a rule for selecting a random access procedure type, determining a signal according to a rule for selecting a signal, and if no random access resource corresponding to the random access procedure type corresponds to the signal, selecting a signal corresponding to a random access resource;

determining a random access procedure type according to a rule for selecting a random access procedure type, determining a signal according to a rule for selecting a signal, and if no random access resource corresponding to the random access procedure type corresponds to the signal, selecting another random access procedure type; or determining a random access procedure type according to a rule for selecting a random access procedure type, determining a signal according to a rule for selecting a signal, and if random access resources corresponding to the random access procedure type correspond to only one signal, selecting the signal.

In this embodiment of this disclosure, optionally, the signal includes any one of the following:
a reference signal;
a measurement symbol corresponding to a cell;
a measurement subframe corresponding to a cell;
a measurement slot corresponding to a cell;
a measurement symbol corresponding to a frequency;
a measurement subframe corresponding to a frequency; or
a measurement slot corresponding to a frequency.

In this embodiment of this disclosure, the random access procedure type includes one or more of the following: 2-step random access procedure or 4-step random access procedure.

In this embodiment of this disclosure, optionally, a random access request message in the 2-step random access procedure includes one or more of the following:
a transmission resource for random access request data information;
a transmission resource for a random access request control message;
a signal corresponding to a transmission resource; or
a carrier corresponding to a transmission resource.

In this embodiment of this disclosure, optionally, the rule for selecting a random access procedure type means that a random access procedure type is selected based on threshold, where different random access procedure types correspond to different thresholds, and the threshold is any one of the following: a measurement threshold of a signal or a size threshold of uplink transmission data.

The terminal provided in this embodiment of this disclosure may perform the foregoing method embodiment. An implementation principle and a technical effect thereof are similar to those of the method embodiment. Details are not described again herein in this embodiment.

Figure 6:
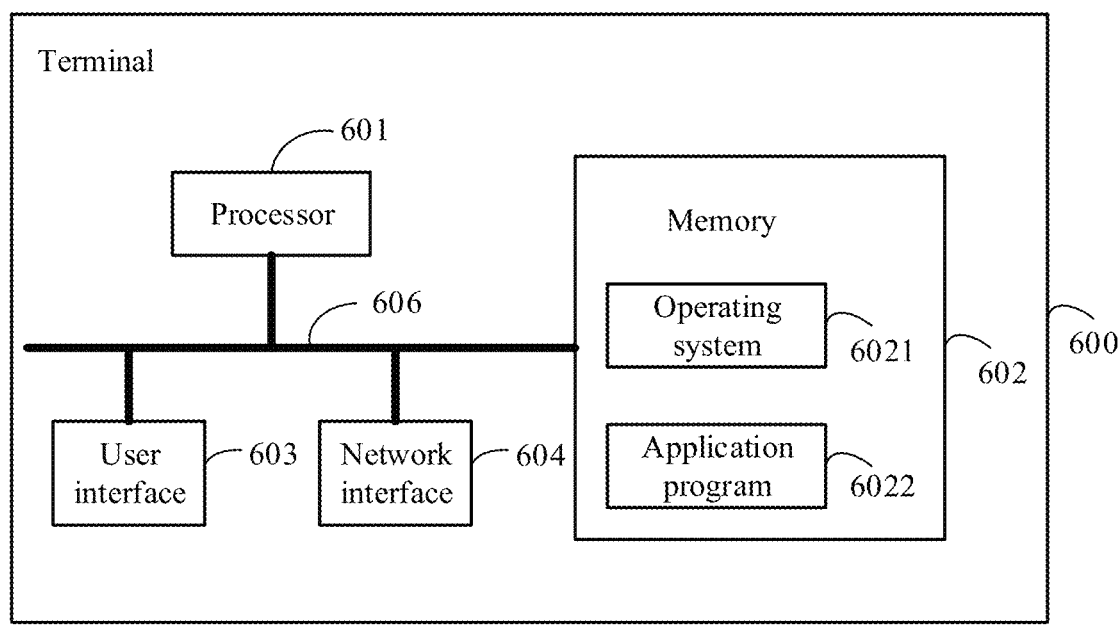
FIG. 6 is a second schematic structural diagram of a terminal according to an embodiment of this disclosure.

As shown in FIG. 6, a terminal 600 shown in FIG. 6 includes at least one processor 601, a memory 602, at least one network interface 604, and a user interface 603. Components of the terminal 600 are coupled together by using a bus system 605. It can be understood that the bus system 605 is configured to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, or a pointing device (for example, a mouse, a trackball, a touch panel, or a touchscreen).

It can be understood that the memory 602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 602 of the system and the method described in the embodiments of this disclosure is intended to include but is not limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player and a browser, which are used to implement various application services. A program for implementing the method in the embodiments of this disclosure may be included in the application program 6022.

In an embodiment of this disclosure, by calling a program or instruction stored in the memory 602, specifically, a program or instruction stored in the application program 6022, the following steps are implemented during execution: determining first information; and determining a random access resource based on a correspondence between first information and random access resources; where the first information includes any one of the following: a signal, an uplink carrier, or a random access procedure type.

The terminal provided in this embodiment of this disclosure may perform the foregoing method embodiment. An implementation principle and a technical effect thereof are similar to those of the method embodiment. Details are not described again herein in this embodiment.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, enabling the processor to read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, persons skilled in the art can make various modifications and variations to the embodiments of this disclosure without departing from the spirit and scope of this disclosure. This disclosure is intended to cover these modifications and variations to the embodiments of this disclosure provided that they fall within the protection scope defined by the claims of this disclosure and their equivalent technologies.

What is claimed is:

1. A method for selecting a random access resource, comprising:
   determining first information according to a rule for selecting a random access resource; and
   determining a random access resource based on a correspondence between first information and random access resources; wherein
   the first information comprises a signal;
   wherein the rule for selecting the random access resource comprises:
   determining an uplink carrier according to a rule for selecting the uplink carrier, determining a random access procedure type according to the uplink carrier and a rule for selecting the random access procedure type, and determining the signal according to the random access procedure type and a rule for selecting the signal; wherein the random access procedure type comprises one or more of the following: 2-step random access procedure or 4-step random access procedure;
   wherein the rule for selecting the uplink carrier comprises:
   selecting the uplink carrier based on a relationship between Reference Symbol Received Power (RSRP) of a downlink signal and an RSRP threshold; or
   selecting, based on a measured result of RSRP for a cell, the uplink carrier corresponding to the cell;
   wherein the rule for selecting the random access procedure type comprises one or more of the following:
   selecting the random access procedure type based on an RSRP threshold;
   selecting the random access procedure type based on a size of data in uplink transmission;
   selecting the random access procedure type based on an RSRP threshold and a size of data in uplink transmission;
   selecting the random access procedure type based on a random number;
   selecting the random access procedure type based on a designated preferred random access procedure type;
   wherein the rule for selecting the signal comprises selecting the signal based on a measurement threshold of the signal.

2. The method according to claim 1, wherein after the determining the random access resource based on the correspondence between first information and random access resources, the method further comprises:
   if the first information is the random access procedure type, and the random access procedure type is 2-step random access procedure, receiving a random access response after transmitting data carried by a data channel;
wherein the receiving the random access response after transmitting data carried by the data channel comprises:
starting a random access response (RAR) reception window timer after transmitting the data carried by the data channel.

3. The method according to claim 2, wherein the starting an RAR reception window timer after transmitting the data carried by the data channel comprises any one of the following:
after transmitting a request message carried by a physical uplink shared channel (PUSCH), starting the RAR reception window timer at a first physical downlink control channel (PDCCH) occasion configured for RAR reception; or
starting the RAR reception window timer at an end boundary of transmission of a request message carried by a PUSCH.

4. The method according to claim 1, wherein the rule for selecting the random access resource further comprises at least one of the following:
determining the uplink carrier according to the rule for selecting the uplink carrier, determining the signal according to the uplink carrier and the rule for selecting the signal, and determining the random access procedure type according to the signal and the rule for selecting the random access procedure type;
determining the signal according to the rule for selecting the signal, determining the random access procedure type according to the signal and the rule for selecting the random access procedure type, and determining the uplink carrier according to the random access procedure type and the rule for selecting the uplink carrier;
determining the random access procedure type according to the rule for selecting the random access procedure type, determining the uplink carrier according to the random access procedure type and the rule for selecting the uplink carrier, and determining the signal according to the uplink carrier and the rule for selecting the signal; or
determining the random access procedure type according to the rule for selecting the signal, determining the signal according to the random access procedure type and the rule for selecting the signal, and determining the uplink carrier according to the signal and the rule for selecting the uplink carrier.

5. The method according to claim 1, wherein the rule for selecting the random access resource further comprises at least one of the following:
determining the uplink carrier according to the rule for selecting the uplink carrier, and determining the random access procedure type according to the uplink carrier and the rule for selecting the random access procedure type;
determining the random access procedure type according to the rule for selecting the random access procedure type, and determining the uplink carrier according to the random access procedure type and the rule for selecting the uplink carrier;
determining the signal according to the rule for selecting the signal, and determining the random access procedure type according to the signal and the rule for selecting the random access procedure type; or
determining the random access procedure type according to the rule for selecting the random access procedure type, and determining the signal according to the random access procedure type and the rule for selecting the signal.

6. The method according to claim 5, wherein the determining the first information according to the rule for selecting the random access resource comprises any one of the following:
in a case that random access resources are configured on a plurality of uplink carriers corresponding to a cell, and that at least two random access procedure types are configured for the random access resources, determining the uplink carrier according to the rule for selecting the uplink carrier, and determining the random access procedure type according to the uplink carrier and the rule for selecting the random access procedure type; or
in a case that random access resources are configured on a plurality of uplink carriers corresponding to a cell, and that at least two random access procedure types are configured for the random access resources, determining the random access procedure type according to the rule for selecting the random access procedure type, and determining the uplink carrier according to the random access procedure type and the rule for selecting the uplink carrier.

7. The method according to claim 5, wherein the determining the first information according to the rule for selecting the random access resource comprises any one of the following:
in a case that corresponding signals are configured for random access resources, and that at least two random access procedure types are configured for the random access resources, determining the signal according to the rule for selecting the signal, and determining the random access procedure type according to the signal and the rule for selecting the random access procedure type; or
in a case that corresponding signals are configured for random access resources, and that at least two random access procedure types are configured for the random access resources, determining the random access procedure type according to the rule for selecting the random access procedure type, and determining the signal according to the random access procedure type and the rule for selecting the signal.

8. The method according to claim 1, wherein the rule for selecting the random access resource further comprises at least one of the following:
determining the random access procedure type according to the rule for selecting the random access procedure type, and selecting one uplink carrier from a plurality of uplink carriers corresponding to random access resources corresponding to the random access procedure type; or
determining a plurality of uplink carriers according to the rule for selecting the uplink carrier, selecting one uplink carrier from the plurality of uplink carriers, determining the random access procedure type according to the uplink carrier and the rule for selecting the random access procedure type; or determining the random access procedure type according to the rule for selecting the random access procedure type.

9. The method according to claim 1, wherein the rule for selecting the random access resource further comprises at least one of the following:
determining the random access procedure type according to the rule for selecting the random access procedure type, determining a plurality of signals corresponding to random access resources corresponding to the random access procedure type, and selecting one signal from the plurality of signals; or determining a plurality of uplink carriers according to the rule for selecting the uplink carrier, selecting one uplink carrier from the plurality of uplink carriers, and determining the random access procedure type according to the uplink carrier and the rule for selecting the random access procedure type.

10. The method according to claim 1, wherein the rule for selecting the random access resource further comprises at least one of the following:

determining the uplink carrier according to the rule for selecting the uplink carrier, determining the random access procedure type according to the rule for selecting the random access procedure type, and if no random access resource corresponding to the random access procedure type is on the uplink carrier, determining another uplink carrier according to the rule for selecting the uplink carrier;

determining the uplink carrier according to the rule for selecting the uplink carrier, determining the random access procedure type according to the rule for selecting the random access procedure type, and if no random access resource corresponding to the random access procedure type is on the uplink carrier, determining another random access procedure type according to the rule for selecting the random access procedure type;

determining the uplink carrier according to the rule for selecting the uplink carrier, determining the random access procedure type according to the rule for selecting the random access procedure type, and if no random access resource corresponding to the random access procedure type is on the uplink carrier, selecting another uplink carrier;

determining the uplink carrier according to the rule for selecting the uplink carrier, determining the random access procedure type according to the rule for selecting the random access procedure type, and if no random access resource corresponding to the random access procedure type is on the uplink carrier, selecting another random access procedure type; or determining the uplink carrier according to the rule for selecting the uplink carrier, determining the random access procedure type according to the rule for selecting the random access procedure type, and if only random access resources corresponding to one random access procedure type are on the uplink carrier, selecting the random access procedure type corresponding to the uplink carrier.

11. The method according to claim 1, wherein the rule for selecting the random access resource further comprises at least one of the following:

determining the random access procedure type according to the rule for selecting the random access procedure type, determining the uplink carrier according to the rule for selecting the uplink carrier, and if no random access resource corresponding to the random access procedure type is on the uplink carrier, determining another uplink carrier according to the rule for selecting the uplink carrier;

determining the random access procedure type according to the rule for selecting the random access procedure type, determining the uplink carrier according to the rule for selecting the uplink carrier, and if no random access resource corresponding to the random access procedure type is on the uplink carrier, determining another random access procedure type according to the rule for selecting the random access procedure type;

determining the random access procedure type according to the rule for selecting the random access procedure type, determining the uplink carrier according to the rule for selecting the uplink carrier, and if no random access resource corresponding to the random access procedure type is on the uplink carrier, selecting another uplink carrier;

determining the random access procedure type according to the rule for selecting the random access procedure type, determining the uplink carrier according to the rule for selecting the uplink carrier, and if no random access resource corresponding to the random access procedure type is on the uplink carrier, selecting another random access procedure type; or determining the random access procedure type according to the rule for selecting the random access procedure type, determining the uplink carrier according to the rule for selecting the uplink carrier, and if random access resources corresponding to the random access procedure type are only on one uplink carrier, selecting the uplink carrier.

12. The method according to claim 1, wherein the rule for selecting the random access resource further comprises at least one of the following:

determining the signal according to the rule for selecting the signal, determining the random access procedure type according to the rule for selecting the random access procedure type, and if no random access resource corresponding to the random access procedure type corresponds to the signal, determining another signal according to the rule for selecting the signal;

determining the signal according to the rule for selecting the signal, determining the random access procedure type according to the rule for selecting the random access procedure type, and if no random access resource corresponding to the random access procedure type corresponds to the signal, determining another random access procedure type according to the rule for selecting the random access procedure type;

determining the signal according to the rule for selecting the signal, determining the random access procedure type according to the rule for selecting the random access procedure type, and if no random access resource corresponding to the random access procedure type corresponds to the signal, selecting the signal corresponding to the random access resource;

determining the signal according to the rule for selecting the signal, determining the random access procedure type according to the rule for selecting the random access procedure type, and if no random access resource corresponding to the random access procedure type corresponds to the signal, selecting another random access procedure type; or determining the signal according to the rule for selecting the signal, determining the random access procedure type according to the rule for selecting the random access procedure type, and if the signal corresponds to only one random access procedure type, selecting the random access procedure type.

13. The method according to claim 1, wherein the rule for selecting the random access resource further comprises at least one of the following:

determining the random access procedure type according to the rule for selecting the random access procedure type, determining the signal according to the rule for selecting the signal, and if no random access resource corresponding to the random access procedure type corresponds to the signal, determining another signal according to the rule for selecting the signal;

determining the random access procedure type according to the rule for selecting the random access procedure type, determining the signal according to the rule for selecting the signal, and if no random access resource corresponding to the random access procedure type corresponds to the signal, determining another random access procedure type according to the rule for selecting the random access procedure type;

determining the random access procedure type according to the rule for selecting the random access procedure type, determining the signal according to the rule for selecting the signal, and if no random access resource corresponding to the random access procedure type corresponds to the signal, selecting the signal corresponding to the random access resource;

determining the random access procedure type according to the rule for selecting the random access procedure type, determining the signal according to the rule for selecting the signal, and if no random access resource corresponding to the random access procedure type corresponds to the signal, selecting another random access procedure type; or determining the random access procedure type according to the rule for selecting the random access procedure type, determining the signal according to the rule for selecting the signal, and if random access resources corresponding to the random access procedure type correspond to only one signal, selecting the signal.

14. The method according to claim 1, wherein the signal comprises any one of the following:
a reference signal; wherein the reference signal is a synchronization signal block (SSB) and/or a channel state information-reference signal (CSI-RS);
a measurement symbol corresponding to a cell;
a measurement subframe corresponding to a cell;
a measurement slot corresponding to a cell;
a measurement symbol corresponding to a frequency;
a measurement subframe corresponding to a frequency; or
a measurement slot corresponding to a frequency.

15. The method according to claim 1, wherein a random access request message in the 2-step random access procedure comprises one or more of the following:
a transmission resource for a random access request data information;
a transmission resource for a random access request control information;
a signal corresponding to a transmission resource; or
a carrier corresponding to a transmission resource.

16. The method according to claim 1, wherein the rule for selecting the random access procedure type means that the random access procedure type is selected based on threshold, wherein different random access procedure types correspond to different thresholds, and the threshold is any one of the following: the measurement threshold of the signal or a size threshold of uplink transmission data.

17. The method according to claim 1, wherein the 2-step random access procedure comprises a step of transmitting MsgA and a step of receiving MsgB, wherein MsgA comprises data.

18. A terminal, comprising a processor, a memory, and a program stored in the memory and capable of running on the processor, wherein the program is executed by the processor to implement:

determining first information according to a rule for selecting a random access resource; and
determining a random access resource based on a correspondence between first information and random access resources; wherein
the first information comprises a signal;
wherein the rule for selecting the random access resource comprises:
determining an uplink carrier according to a rule for selecting the uplink carrier, determining a random access procedure type according to the uplink carrier and a rule for selecting the random access procedure type, and determining the signal according to the random access procedure type and a rule for selecting the signal; wherein the random access procedure type comprises one or more of the following: 2-step random access procedure or 4-step random access procedure;
wherein the rule for selecting the uplink carrier comprises:
selecting the uplink carrier based on a relationship between Reference Symbol Received Power (RSRP) of a downlink signal and an RSRP threshold; or
selecting, based on a measured result of RSRP for a cell, the uplink carrier corresponding to the cell;
wherein the rule for selecting the random access procedure type comprises one or more of the following:
selecting the random access procedure type based on an RSRP threshold;
selecting the random access procedure type based on a size of data in uplink transmission;
selecting the random access procedure type based on an RSRP threshold and a size of data in uplink transmission;
selecting the random access procedure type based on a random number;
selecting the random access procedure type based on a designated preferred random access procedure type;
wherein the rule for selecting the signal comprises selecting the signal based on a measurement threshold of the signal.

19. A non-transitory computer-readable storage medium, wherein the non-transitory computer-readable storage medium stores a computer program, and the computer program is executed by a processor to implement:
determining first information according to a rule for selecting a random access resource; and
determining a random access resource based on a correspondence between first information and random access resources; wherein
the first information comprises a signal;
wherein the rule for selecting the random access resource comprises:
determining an uplink carrier according to a rule for selecting the uplink carrier, determining a random access procedure type according to the uplink carrier and a rule for selecting the random access procedure type, and determining the signal according to the random access procedure type and a rule for selecting the signal; wherein the random access procedure type comprises one or more of the following: 2-step random access procedure or 4-step random access procedure;
wherein the rule for selecting the uplink carrier comprises:
selecting the uplink carrier based on a relationship between Reference Symbol Received Power (RSRP) of a downlink signal and an RSRP threshold; or selecting, based on a measured result of RSRP for a cell, the uplink carrier corresponding to the cell;

wherein the rule for selecting the random access procedure type comprises one or more of the following:

selecting the random access procedure type based on an RSRP threshold;

selecting the random access procedure type based on a size of data in uplink transmission;

selecting the random access procedure type based on an RSRP threshold and a size of data in uplink transmission;

selecting the random access procedure type based on a random number;

selecting the random access procedure type based on a designated preferred random access procedure type;

wherein the rule for selecting the signal comprises selecting the signal based on a measurement threshold of the signal.

\* \* \* \* \*